Feb. 9, 1926.

C. P. HEIDE

BUMPER AND BRACKET THEREFOR

Filed Feb. 24, 1925  2 Sheets-Sheet 1

1,572,603

Inventor:
Christen P. Heide
by Eugene Swan Atty.

Feb. 9, 1926.
C. P. HEIDE
BUMPER AND BRACKET THEREFOR
Filed Feb. 24, 1925
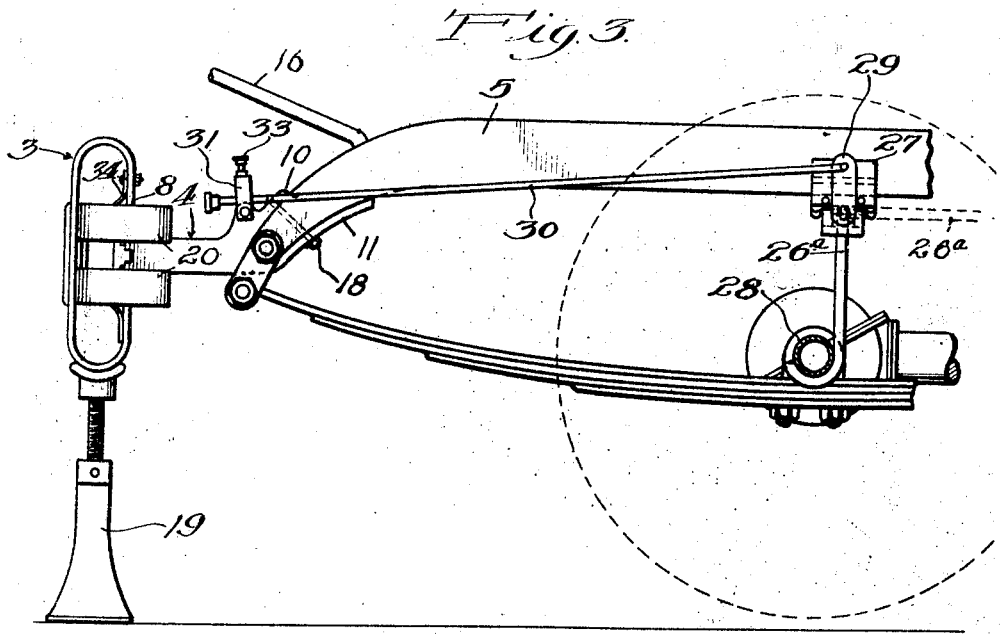
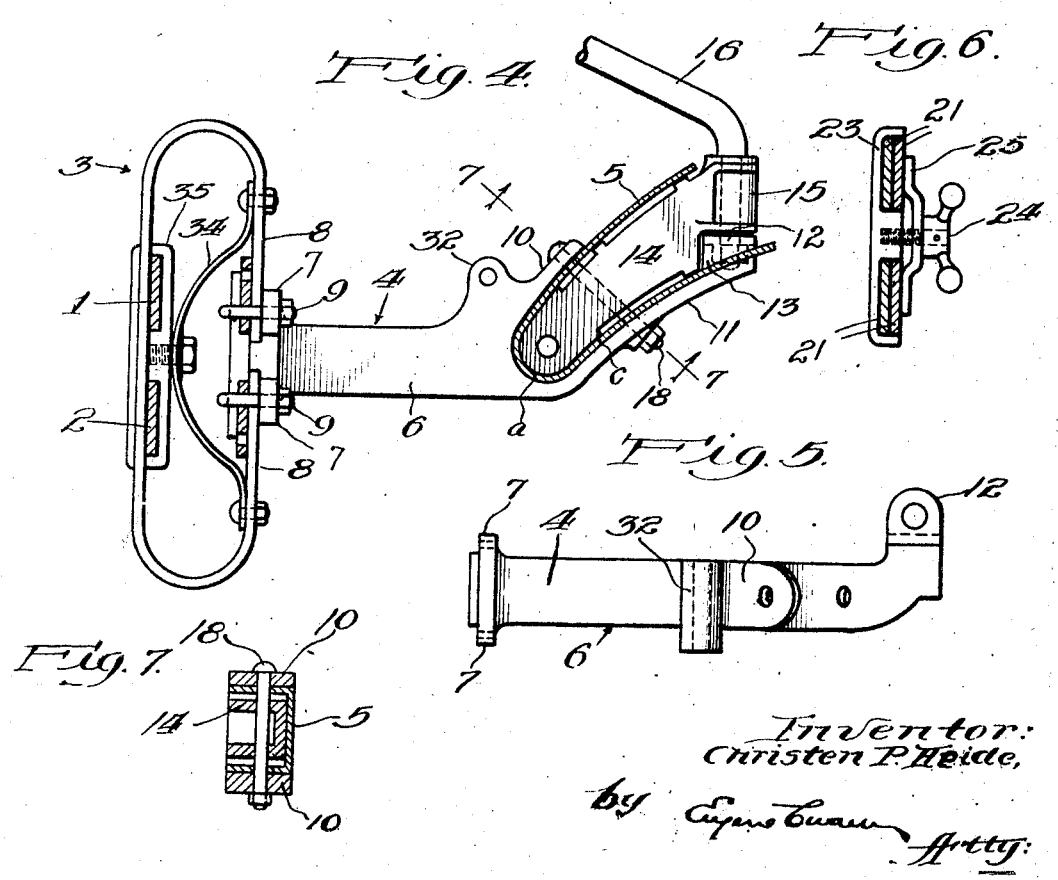
Inventor:
Christen P. Heide, Patented Feb. 9, 1926.

1,572,603

UNITED STATES PATENT OFFICE.

CHRISTEN P. HEIDE, OF KENOSHA, WISCONSIN, ASSIGNOR TO TOM C. IGO, OF CHICAGO HEIGHTS, ILLINOIS.

BUMPER AND BRACKET THEREFOR.

Application filed February 24, 1925. Serial No. 11,002.

*To all whom it may concern:*

Be it known that I, CHRISTEN P. HEIDE, a citizen of the United States, residing at Kenosha, in the county of Kenosha and State of Wisconsin, have invented new and useful Improvements in Bumpers and Brackets Therefor, of which the following is a specification.

This invention relates to motor vehicle bumpers and brackets therefor.

The Igo Patent No. 1,520,951, granted December 30, 1924, discloses a rear bumper having a horizontal bumper means and vertical guards adjacent the ends of the horizontal means and extending above and below the same, with the portion of the bumper means between the guards made of hinged bars adapted to be opened up to provide a passageway through the bumper for convenient access to the spare wheel carried at the rear of the car.

A jacking attachment for use with this general type of bumper is shown in the Igo Patent No. 1,375,515, granted April 19, 1921, and includes hook shaped members pivotally carried by the frame on opposite sides above the rear axle and adapted to be swung into and out of engagement with the under side of the rear axle to couple the frame and axle together when the car is raised by a jack placed under the vehicle guard of the bumper. In connection with this jacking equipment, the bracket which attaches the bumper to the frame of the car must be made strong enough and have connection with the car frame in such manner as to withstand the load of the car when the jack raises the same through the bumper.

One object of my invention is to provide a bracket for a bumper of this general type and have the bracket so engage the frame of the car that there are many points of support between the bracket and the frame so that the bracket will withstand the load of the car when the latter is jacked up through the bumper.

A further object of my invention is to have the bracket especially designed for attaching this type of bumper to a Nash car.

A further object of my invention is to so design the bracket that it is connected with one of the rods of the spare wheel carrier as used on the Nash car.

A further object of my invention is to make the rear bumper of a plurality of vertically spaced horizontal bars, the portions of which between the vertical guards are formed of hinged bars, which when opened up provide a passageway through the bumper for access to the spare wheel.

The invention consists further in the matters hereinafter described and claimed.

In the accompanying drawings—

Fig. 3 is an enlarged vertical sectional view on line 3—3 of Fig. 1;

Fig. 4 is an enlarged vertical sectional view on line 4—4 of Fig. 2;

Fig. 5 is a top plan view of the bracket;

Fig. 6 is a vertical sectional view through the hinged bars of the bumper on line 6—6 of Fig. 2; and Fig. 7 is a section on line 7—7 of Fig. 4.

Figure 1:
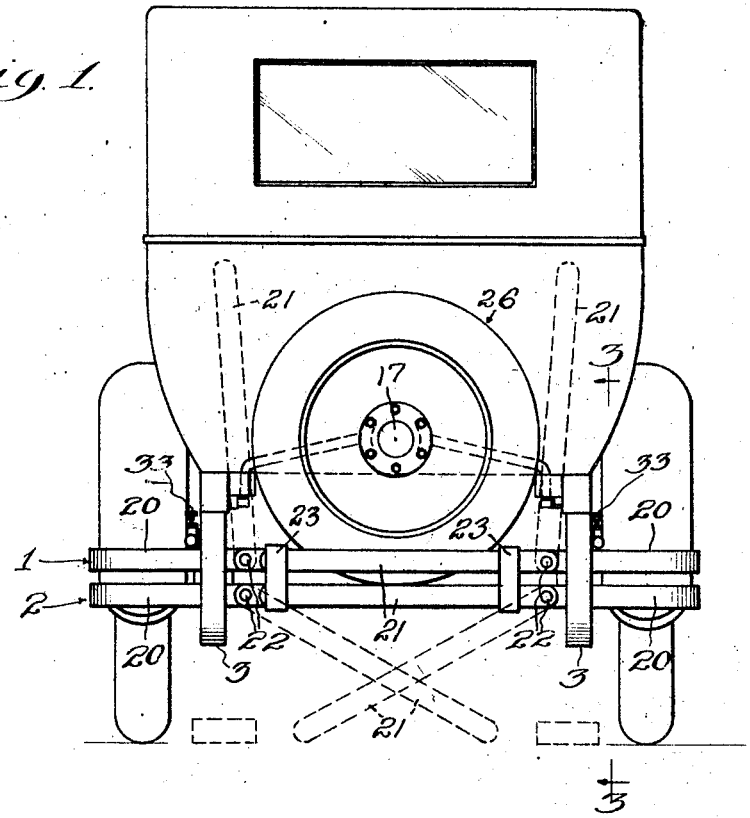
Fig. 1 is a rear view of an automobile equipped with a bumper and brackets of my invention.

The bumper comprises two vertically spaced horizontal bumper members 1, 2 and vertical guards 3, 3 extending across said bumper members and above and below the same. These guards are adjacent the ends of the members 1, 2 and are carried by brackets 4, 4, by means of which the entire bumper assembly is secured to the side members 5, 5 of the automobile frame or chassis, as shown in the drawings.

Each bracket 4 is a steel casting with a straight body portion 6 having flanges 7, 7 at its outer end and extending above and below the same when the bracket is in use. The inner sections 8, 8 of the associated guard member 3 are secured to these flanges by U-bolts 9, 9, as shown in Fig. 4.

The inner end of said body portion 6 is upturned and bifurcated to receive the adjacent end of the frame member 5, as shown in Fig. 4. This bifurcated portion extends around the end of the frame member with the upper part 10 of the bifurcation extending along the upper side of the frame member and the lower part 11 along the under side. The part 11 is considerably longer than the part 10 and is provided at its inner end with a laterally extending lug 12. Said lug 12 is so arranged as to be horizontal when the bracket is attached to the frame and is offset above the bottom part 11 by an interposed integral web 13.

The frame member 5 is channel-shaped, as shown in Fig. 7, and set in the channel of the same at the bracket is a casting 14 shaped to fill the channel and extend to the end thereof, as shown in Fig. 4. This casting 14 has at its inner end an inwardly extending boss 15, through which extends the lower end of one of the rods 16 of the spare wheel carrier 17. This rod extends through the boss and lug 12 and is clamped by a nut on the under side of the lug, as shown in Fig. 4. The spring shackle (not shown) is connected with the casting 14. The bracket 4 is secured to the frame member 5 by a bolt 18 extending through the parts 10 and 11 of the bracket and the interposed frame member 5 and the casting 14, as shown in Fig. 4.

A strong and rigid connection is made by having the brackets 4, 4 engaged about the ends of the frame members 5 and clamped thereto in the manner shown and described. This connection clamps integral parts of the brackets on opposite sides of the frame members to readily take the load of the car when jacked up through either vertical guard 3, as indicated by the jack 19 in Fig. 3. This is due in part to the bracket parts 10, 11 resisting the lifting and load strains, respectively, on opposite sides of the frame members 5, 5 and in being held in tight and substantially continuous contact therewith by the bolts 16 and 18.

Figure 2:
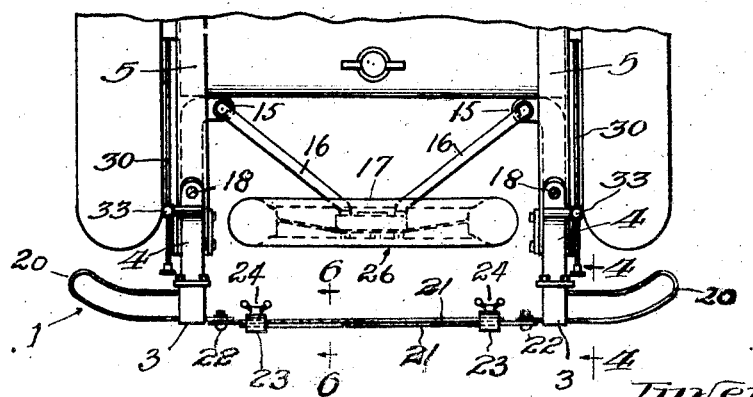
Fig. 2 is a top plan view of the parts shown in Fig. 1.

The bumper members 1, 2 and the guards 3 are made of heavy spring steel. Each horizontal bumper member 1 and 2 is divided into end sections 20, 20 and a mid section comprising a pair of front and rear overlapping bars 21, 21, as shown in Fig. 2. These bars are hinged or pivoted to the respective end sections 20, 20 by horizontal pins or studs 22, 22 so that the mid portion of the bumper may be opened to provide a free passageway therethrough on swinging the bars up and down, respectively, as shown in dotted lines in Fig. 1. When overlapped and closing the bumper, said bars are clamped together by clamp plates 23, 23 extending across both sets of bars on the outside and clamped thereto by screws 24, as shown in Figs. 2 and 6. These screws take into the plates 23 between the bars 21 and pass through rear plates 25, which bear against the rear bars 21, 21, as shown in Fig. 6.

By loosening the clamps and sliding them off the free ends of the bars 21, the bumper members may be opened up to provide a passageway through the bumper, as described, and thus allow the spare wheel 26 to be readily reached and removed, or put on the carrier.

As shown in Fig. 3, the jacking attachment at each side of the car includes a hook member 26ª pivotally carried by a block 27 clamped to the side member 5 above the axle housing 28. The shaft on which this hook member is mounted is provided with an arm 29, to which is connected an actuating rod 30 extending to the rear of the car and being slidably guided by a block 31 pivotally mounted on the bracket 4 at the upper part 10, as shown in Fig. 3. The bracket has an upstanding lug 32 for this block mounting. The block carries a plunger 33 to engage the rod and hold it in position either with the hook 26ª down under the axle housing 28, as shown in Fig. 3, so that the jack 19 may raise the rear wheel of the car off the ground through the guard 3, or in a position with the hook 26ª raised out of engagement with the axle, as when the car is in use, as shown in dotted lines in Fig. 3.

As clearly shown in Fig. 2, the end sections 20 are bent on themselves to have front and rear portions, which extend into the guards 3. The rear portions are secured against the inside of the guards by the bolts 9. The front portions are yieldably held against the front sections of the guards by bowed springs 34 connected with plates 35 extending across the front sections of the ends 20 of both the bumper sections 1, 2 and grooved or channeled to receive them, as shown in Fig. 4. By the bosses 15, the brackets 4 are tied to the two rods 16, 16 of the spare wheel carrier of the Nash car. This readily adapts the brackets and bumper to such Nash car.

The details shown and described may be variously changed and modified without departing from the spirit and scope of my invention.

I claim as my invention:

1. The combination with the side members of a motor vehicle chassis and a horizontal bumper at one end of the same, of brackets carried by the bumper and extending between the same and the chassis, said brackets having their inner ends bifurcated and upturned to receive and extend about the associated ends of the side members, and means for clamping the ends of the brackets thereto.

2. The combination with the side members of a motor vehicle chassis and a bumper at one end of the same, of brackets secured to the bumper and having their inner ends bifurcated and upturned to receive and extend about the associated ends of said side members, the lower parts of the bifurcations being longer than the upper parts and having lugs at their inner ends to be clamped to the lower ends of spare wheel carrier rods, said members carrying bosses over the lugs for the rods to pass through, and bolts for clamping the upper and lower parts of the brackets to said side members.

3. The combination with a spring connected motor vehicle frame and axle below the same, of a hook member carried by the frame and swingable into and out of engagement with the under side of the axle for coupling the frame and axle together, a bumper at one end of the frame and having vertical guards, brackets secured to the bumper and having their inner ends clamped to the side members of the frame, said brackets having their inner ends bifurcated and engaging about the associated side members above and below the same to resist load and lifting strains when jacking up the car through a guard of the bumper.

4. The combination with channeled side members of a motor vehicle chassis and a bumper at one end of the same, of brackets secured to the bumper and having their inner ends bifurcated to engage about the associated ends of said side members, castings fitting in said channels and having inwardly extending bosses to receive the lower ends of spare wheel carrier rods, said brackets having lugs under said bosses and to be clamped thereto by nuts on said rods, and clamp bolts clamping the brackets, frame, and castings together.

5. The combination with the side members of a motor vehicle chassis and a horizontal bumper means at one end of the same, of brackets securing the bumper means to the chassis, said brackets having their inner ends bifurcated to receive and extend about the associated ends of the side members, and means for clamping the bifurcated ends of the brackets to said side members.

In testimony that I claim the foregoing as my invention, I affix my signature this 10 day of December, 1924.

CHRISTEN P. HEIDE.